United States Patent [19]

Vlahovic

[11] Patent Number: 5,839,777
[45] Date of Patent: Nov. 24, 1998

[54] SUPPORT OF A BODY STRUCTURE OF A VEHICLE AND PROCESS FOR MANUFACTURING SAME

[75] Inventor: Josip Vlahovic, Bietigheim-Bissingen, Germany

[73] Assignee: Dr. Ing. h.c.F. Porsche AG, Weissach, Germany

[21] Appl. No.: 644,825

[22] Filed: May 10, 1996

[30] Foreign Application Priority Data

May 26, 1995 [DE] Germany ......................... 195 19 353.9

[51] Int. Cl.$^6$ .................................................. B62D 25/00
[52] U.S. Cl. ............................................. 296/205; 296/29
[58] Field of Search ....................................... 296/205, 29

[56] References Cited

U.S. PATENT DOCUMENTS

| 4,986,597 | 1/1991 | Clausen .................................. | 296/205 |
| 5,213,386 | 5/1993 | Janotik et al. . | |
| 5,269,585 | 12/1993 | Klages et al. ............................ | 296/205 |
| 5,549,352 | 8/1996 | Janotik et al. ........................... | 296/205 |
| 5,553,906 | 9/1996 | Kunz ......................................... | 296/29 |

FOREIGN PATENT DOCUMENTS

| 0167978A2 | 1/1986 | European Pat. Off. . | |
| 0494116A2 | 7/1992 | European Pat. Off. . | |
| 2345243 | 10/1977 | France . | |
| 4214557A1 | 11/1993 | Germany . | |
| 4214557C2 | 11/1993 | Germany . | |
| 404046875 A | 2/1992 | Japan ....................................... | 296/205 |
| 928912 | 6/1963 | United Kingdom . | |
| WO90/02680 | 3/1990 | WIPO . | |
| WO94/04766 | 3/1994 | WIPO . | |

*Primary Examiner*—Gary C. Hoge
*Attorney, Agent, or Firm*—Evenson, McKeown, Edwards & Lenahan, PLLC

[57] ABSTRACT

A support of a body structure of a vehicle is formed by hydraulic expansion of hollow blanks. In order to achieve that the support is adapted to the locally occurring loads, it is provided that, at least along a partial area of its longitudinal course, the support is composed of at least two form-lockingly connected, hydraulically expanded, mutually in parallel extending hollow profiles.

10 Claims, 5 Drawing Sheets

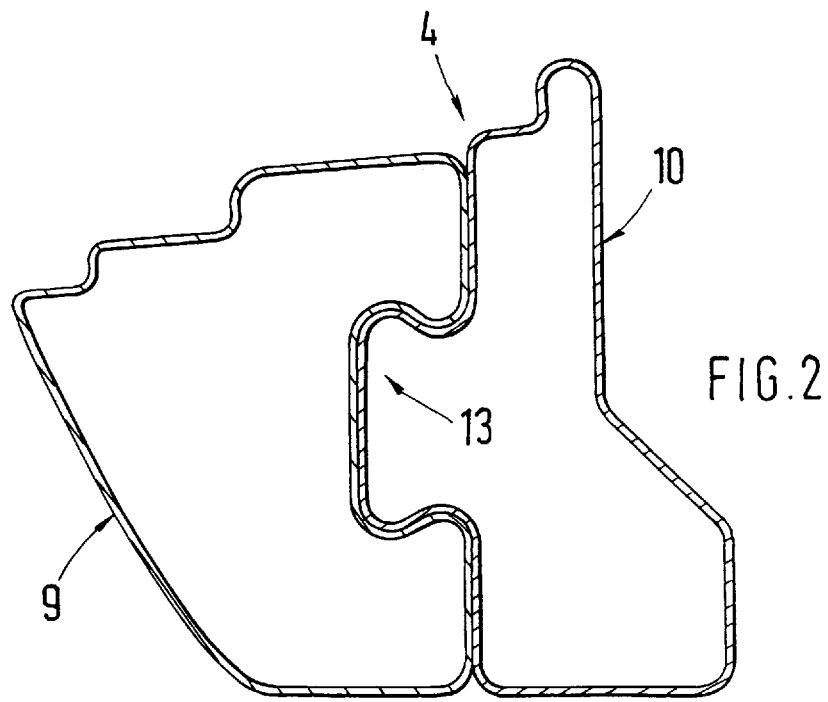
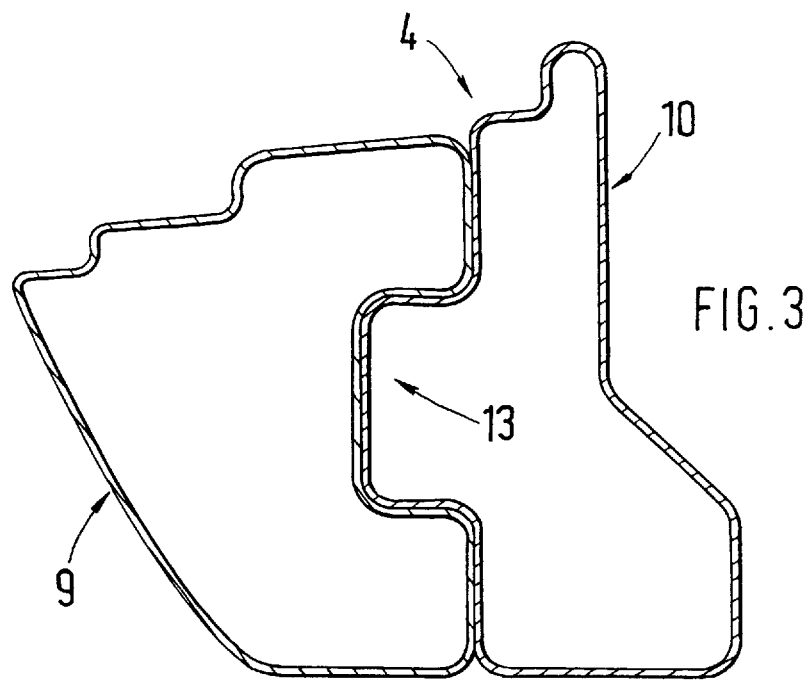

SUPPORT OF A BODY STRUCTURE OF A VEHICLE AND PROCESS FOR MANUFACTURING SAME

BACKGROUND AND SUMMARY OF THE INVENTION

This invention relates to a support of a body structure of a vehicle and to a process for manufacturing same utilizing internal high pressure deformation of tubular parts.

A support of the above-mentioned type is found in German Patent Document DE 42 14 557 C2. This document describes a hollow profile manufactured by hydraulically expanding a preprofiled starting part or blank. Such supports are used in the motor vehicle body construction, for example, in the case of door frames, columns and the like.

In the case of supports which have a relatively long longitudinal dimension and extend, for example, along an A-column and an adjoining lateral roof frame, there is the problem that partial areas of the supports are relatively heavily stressed whereas other partial areas have lower stresses. When the support is constructed in one piece, it: must be designed such that it withstands the highest occurring stresses. It is therefore necessary that partial areas of the support are overdimensioned and will unnecessarily increase the weight of the support.

It is an object of the invention to take such measures on a support of a body structure that the support is adapted to the respective occurring loads.

According to the invention, this object is achieved by providing an arrangement wherein the support is composed, at least along a partial area of its longitudinal course, of at least two hydraulically expanded, parallel extending hollow profiles which are form-lockingly connected with one another.

Principal advantages achieved by means of the invention are that the support is composed, at least along a partial area of its longitudinal course, of at least two hydraulically expanded hollow profiles which are connected with one another in a form-locking manner. As a result, it is achieved that, in highly stressed areas, the support can reliably absorb the occurring loads, whereas, in lower-stressed areas, only one hollow profile is continued which withstands the loads occurring there. As a result, an optimal adaptation is achieved with respect to the stability and the weight.

By means of the preferably form-locking connection between the hollow profiles, a simple, low-cost connection technique is provided. The hollow profiles may be made of steel or of a light metal. As required, an additional local connection between the hollow profiles may take place by means of gluing or welding. The receiving device on a hollow profile is preferably provided with an undercut. The hollow profiles can be produced in a simple manner and at low cost by means of internal high-pressure metal forming.

Other objects, advantages and novel features of the present invention will become apparent from the following detailed description of the invention when considered in conjunction with the accompanying drawings.

BRIEF DESCRIPTION OF THE DRAWINGS

FIG. 2 is an enlarged sectional view taken along Line II—II of FIG. 1 of the side member of the vehicle, depicting a first embodiment of the present invention;

FIG. 3 is an enlarged sectional view taken along Line III—III of FIG. 1 of the side member of the vehicle depicting a second embodiment of the present invention;

DETAILED DESCRIPTION OF THE DRAWINGS

Figure 1:
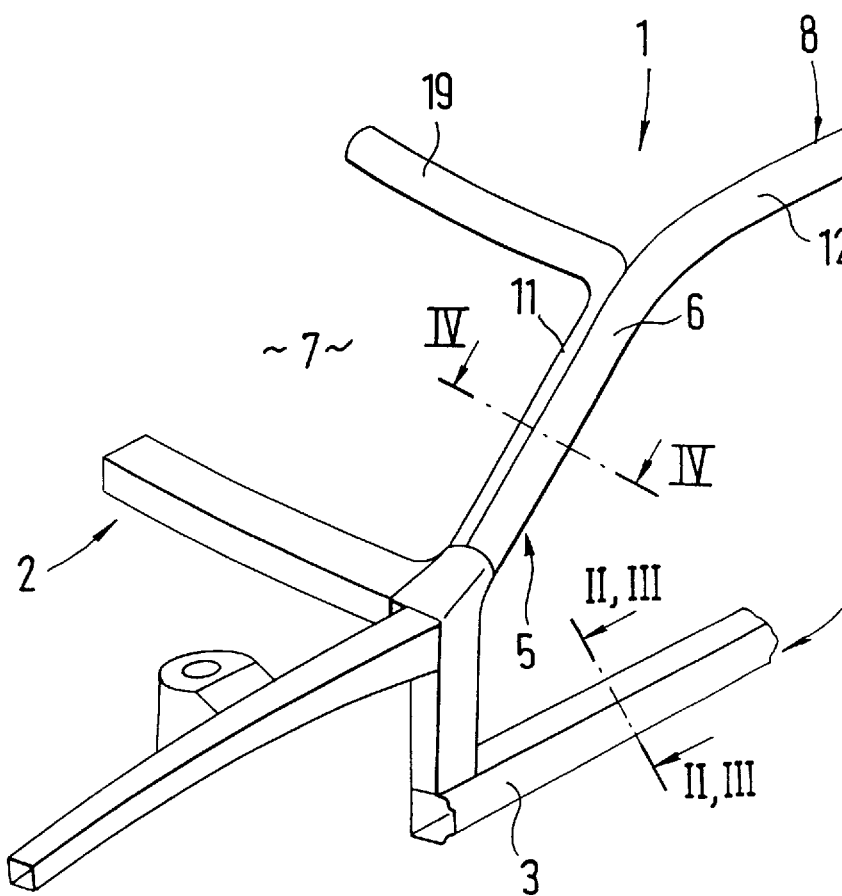
FIG. 1 is a perspective partial view diagonally from the front of a body structure of a vehicle, constructed according to a preferred embodiment of the present invention.
Figure 4:
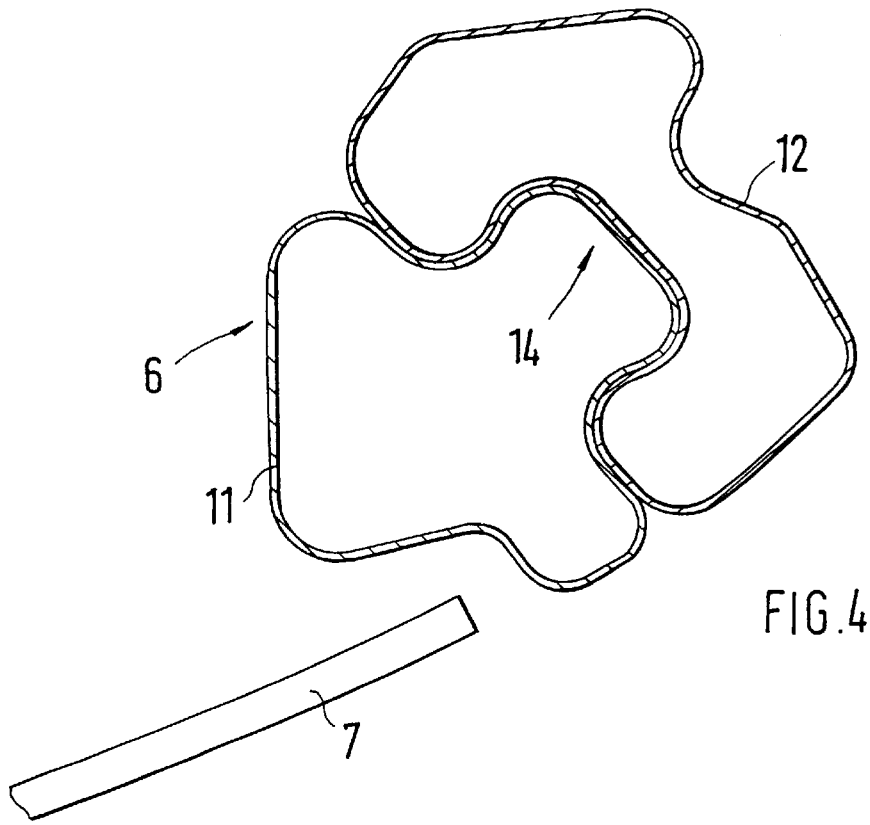
FIG. 4 is an enlarged sectional view taken along Line IV—IV of FIG. 1 of the A-column of the vehicle according to a first embodiment.
Figure 5:
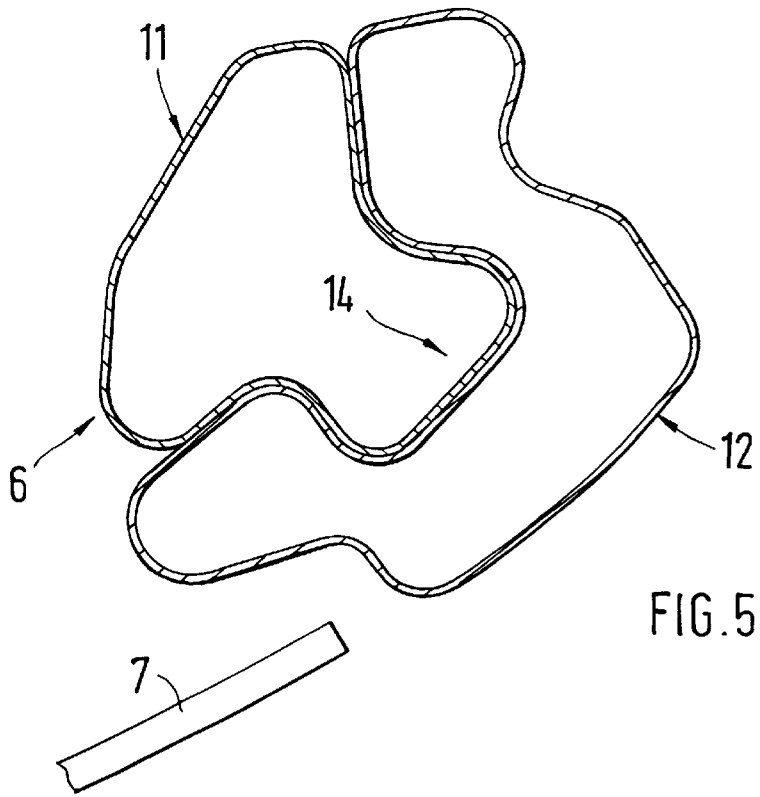
FIG. 5 is a sectional view corresponding to FIG. 4 of another embodiment of the A-column.

FIG. 1 illustrates a partial area of a vehicle 1, particularly of a passenger car, having a body structure 2 manufactured in the space frame construction method and composed of a plurality of mutually connected supports.

In the embodiment shown, only a support 4 formed by a side member 3 and a support 6 constructed as an A-column 5 are discussed. The A-column extends along a lateral edge of a windshield 7 as well as along a lateral roof frame 8 of the body structure 2.

According to the invention, it is provided that the supports 4, 6 are composed, at least along a partial area of their longitudinal course, of at least two hydraulically expanded, in-parallel extending hollow profiles 9, 10 and 11, 12 which are form-lockingly connected with one another. In highly loaded areas, the support 4, 6 therefore consists of at least two hollow profiles 9, 10 and 11, 12 which are connected with one another in a form-locking manner, whereas in-areas exposed to a lower load, only one of the two hollow profiles is continued (FIG. 2 to 5).

In a common connection area of two adjoining hollow profiles 9, 10 and 11, 12, a receiving device 13, 14 is constructed on a hollow profile, for example, 9, 10, into which receiving device 13, 14 the other hollow profile 10, 11 is inserted at least in sections in a form-locking member.

According to FIG. 2 to 5, the receiving device 13, 14 is formed by a groove-shaped impression which is provided with an undercut, preferably adjacent to a feed opening, for accommodating insertion of the other hollow profile. In the embodiment shown in FIG. 3, the receiving device 13 has no undercut.

The form-lockingly interacting hollow profiles 9, 10 and 11, 12 may, in addition, be connected with one another locally by means of welding, gluing or the like.

The manufacturing of such a support 4, 6 takes placed as follows: A first tube-shaped or preprofiled blank is placed in a multi-part tool and is then hydraulically expanded by means of internal high-pressure deforming whereby the finished first hollow profile 9, 12 is created. In the case of this widening operation, the groove-shaped receiving device 13, 14 is created on the first hollow profile 9, 12. After the conclusion of the first inflating operation, the top part of the tool is removed and a second tube-shaped or preprofiled blank is inserted into the receiving device 13, 14 of the first: hollow profile 9, 12. The liquid for the inflating of the first hollow profile 9, 12 is still situated in it, the liquid pressure being controllable.

Now a new top part is placed on the existing bottom part and the second blank is hydraulically widened. By means of this inflating operation, at least a partial area of the circumference of the second blank is form-lockingly placed on the adjoining wall of the receiving device 13, 14, providing a secure connection between the two hollow profiles 9, 10. The first hollow profile preferably has a larger wall thickness than the second hollow profile.

Figure 6:
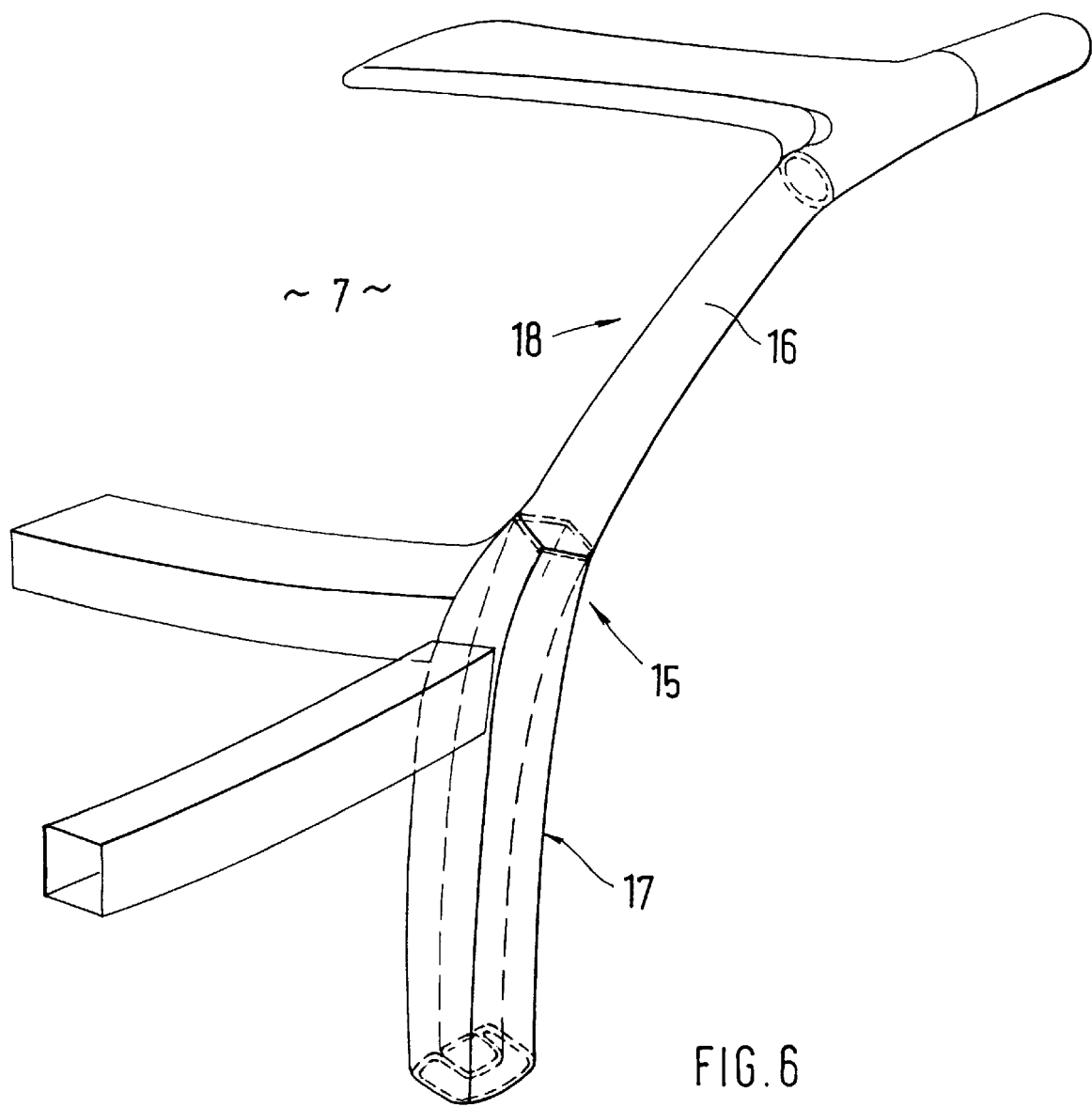
FIG. 6 is a perspective partial view diagonally from the front of an A-column of the body structure with adjoining supports.
Figure 7:
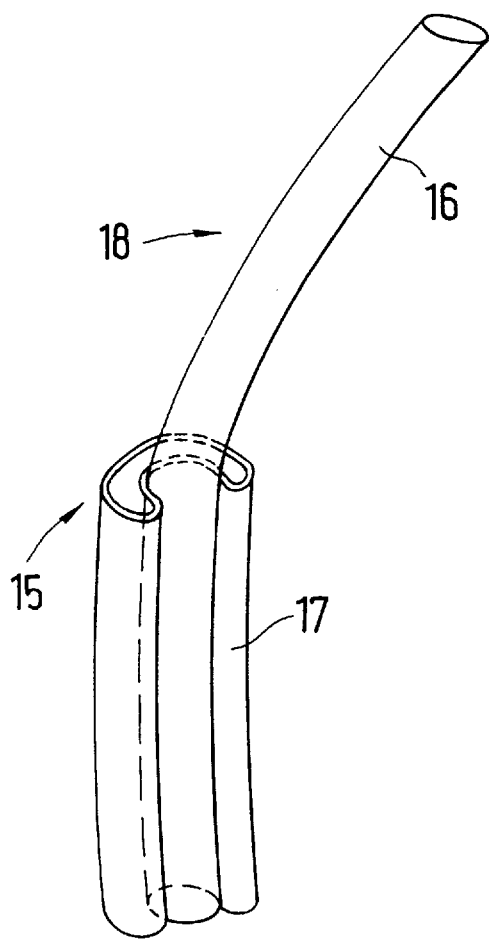
FIG. 7 is a view similar to FIG. 6 of another embodiment of the A-column.
Figure 8:
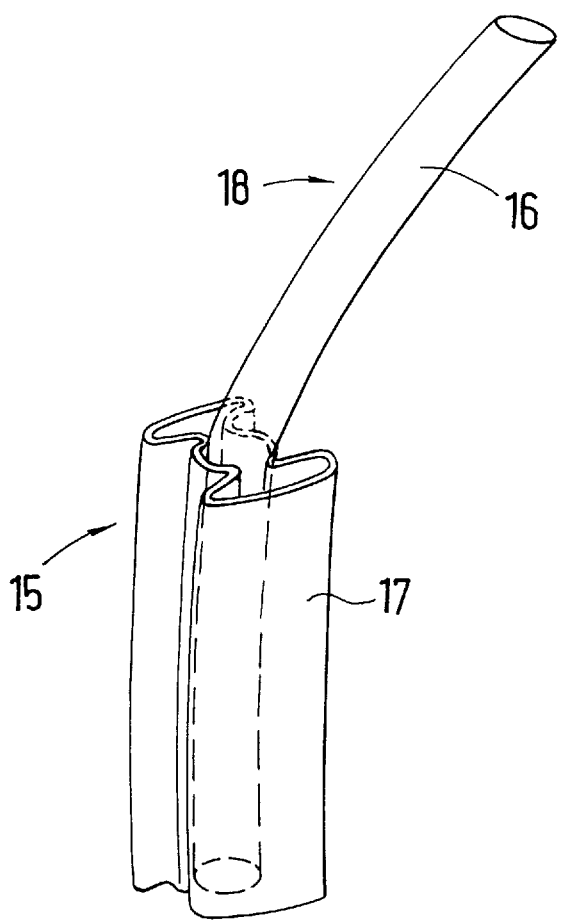
FIG. 8 is another view similar to FIG. 6 of an additional embodiment of the A-column.

FIGS. 6 to 8 illustrate an A-column 15 consisting of two hollow profiles 16, 17 fitted into one another, whereas, in an upper partial area 18 of the longitudinal course, only the hollow profile 16 is continued.

The hydraulically expanded supports may be made of steel or of a light metal.

According to FIG. 1, the A-column 5 is composed of two hollow profiles 11, 12, the hollow profile 12 continuing along the lateral roof frame 8. On its upper end, the other hollow profile 11 is bent inward and forms a transversely extending upper support 19 of the windshield frame.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Support of a body structure of a vehicle which is formed by hydraulic expanding internal high-pressure deforming, wherein the support is composed, at least along a partial area of its longitudinal course, of at least two hydraulically expanded, parallel extending hollow profiles which are form-lockingly connected with one another.

2. Support according to claim 1, wherein the support is composed of two hollow profiles in areas which in use are highly stressed, said two hollow profiles being form-lockingly connected with one another, whereas in areas subjected in use to lower loads, only one of the two hollow profiles is continued.

3. Support according to claim 1, wherein a receiving device is formed on a hollow profile in a common connection area of two adjoining hollow profiles, in which receiving device the other hollow profiled is inserted in a form-locking manner.

4. Support according to claim 3, wherein the receiving device is provided with an undercut.

5. Support according to claim 2, wherein both hollow profiles are, in addition, locally connected with one another by welding or gluing.

6. Support according to claim 3, wherein both hollow profiles are, in addition, locally connected with one another by welding or gluing.

7. Support according to claim 4, wherein both hollow profiles are, in addition, locally connected with one another by welding or gluing.

8. Support according to claim 2, wherein the first hollow profile has a larger wall thickness than the second hollow profile.

9. Support according to claim 3, wherein the first hollow profile has a larger wall thickness than the second hollow profile.

10. Support of a body structure of a vehicle which is formed by hydraulic expansion with internal high-pressure deformation comprising:

at least two hydraulically expanded, parallel hollow profiles extending at least partially along an area of a longitudinal course of the support, said profiles being form-lockingly connected with one another by interacting portions of said hydraulically expanded, parallel hollow profiles.

* * * * *